FIG. 1A

United States Patent Office 3,795,563
Patented Mar. 5, 1974

3,795,563
TIRE BUILDING MACHINE SERVICER
George E. Enders, Salem, and Armindo Cantarutti, Akron, Ohio, assignors to NRM Corporation, Akron, Ohio
Filed June 19, 1972, Ser. No. 264,158
Int. Cl. B29h 17/10, 17/20, 17/30
U.S. Cl. 156—406                                    20 Claims

ABSTRACT OF THE DISCLOSURE

A tire building machine servicer characterized in the provision of a stock storage and conveyor means which is loaded with tire components from a series of stock let-off units which are successively indexed to positions in alignment with one end of said conveyor means, said let-off units in the case of a radial truck tire, for example, comprising successive first and second cordless gum ply stock rolls and a cord ply stock roll, said conveyor means being equipped with drive means for driving the respective stock rolls and with severing means to cut the respective plies to exact lengths as required for application on the tire building drum. Said conveyor means is further characterized in that it has centering means to center the stock loaded thereonto from said let-off units and to center the stock as it is dispensed from said conveyor means onto the tire building drum.

The servicer herein is further characterized in that another series of let-off units carrying stock rolls of other tire components are indexed along a path parallel to the longitudinal axis of the tire building drum for successive application of, for example, the finishing strips, a belt cushion strip, and first, second, and third belts to the tire building drum as the tire building operation proceeds. During the operation of the last-mentioned series of let-off units, the storage and conveyor means may be loaded with stock for storage therein until the next tire is ready to be built.

Yet a further characterizing feature of the present servicer is that the tread and side wall components of the tire are stored on carriers which are in alignment with the conveyor means but disposed at the opposite side of the tire building drum, said carriers being advanced toward and away from the tire building drum for application of the respective components thereto, said tread components in the case of a radial tire building machine being stored in a looped configuration to shorten the length of the tread carrier.

BACKGROUND OF THE INVENTION

In known servicers for tire building machines as shown for example, in the patents to Mallory 2,658,691, Mallory et al. 3,216,879, and 3,230,132, and Cantarutti 3,278,360, the carriers for the tire component stock rolls are each in the form of a ferris wheel which is indexed about its central horizontal axis to position the respective tire components for application to the tire building drum. The Mallory et al. patents contemplate the provision of dual ferris wheels which are alternately moved to operating position adjacent the tire building drum to supply ply stock for application on the drum, and to a loading position whereat the stock supply rolls are replenished with ply stock.

Furthermore, in known servicers there is usually provided between the servicer and the tire building drum a ply stock severing apparatus such as that disclosed in the Cantarutti Pat. 3,429,490 which severs the ply stock to predetermined length between the parallel cords thereof.

As aforesaid, the known ferris wheel servicers generally are loaded with ply stock supply rolls and hence other tire components such as finishing strips, belt cushions, belts, side wall strips, and tread slabs are separately supplied for application onto the tire building drum.

SUMMARY OF THE INVENTION

In contradistinction to known servicers, the present servicer comprises three basic components namely (1) a ply storage and conveyor means which is loaded with the required plies to build a single tire from a lineal series of ply let-off units which are successively indexed with respect to the conveyor means while other tire building operations are in progress, the conveyor means being equipped with longitudinally interleaved conveyor sections to accommodate the required number of plies and further being equipped with severing means and centering means; (2) a lineal series of additional let-off units having component support trays which are appropriately positioned adjacent the tire building drum upon indexing of said additional let-off units along a path parallel to the longitudinal axis of the tire building drum, said additional let-off units being disposed underneath the storage and conveyor means to enable application of finishing strips, belt cushions, and belts on to the tire building drum during the time that the storage and conveyor means is being loaded; and (3) side wall and tread carriers mounted for movement toward and away from the tire building drum on the side of the drum opposite to the side on which the storage and conveyor means and the additional stock let-off units are disposed in over-under relation.

It is another principal object of this invention to provide storage and conveyor means as aforesaid which employs conveyor drive means coupled with the successive let-off units to feed the stock therefrom to the conveyor means, the let-off units comprising interconnected ply carts, one of which has a drive means for moving the series of carts along rails parallel to the longitudinal axis of the tire building drum for successively indexing the stock rolls on the respective carts into register with the conveyor means for loading of the latter during the time that other tire building operations are being performed.

It is another object of this invention to provide another set of rails parallel to the longitudinal axis of the tire building drum on which another series of interconnected let-off carts are provided for successive indexing for application of, for example, finishing strips, a belt cushion, and a plurality of belts onto the tire building drum following application thereto of the plies from the ply storage and conveyor means, and again, as in connection with the ply let-off units, said another series of let-off carts are driven in stepwise manner by a drive means on one of the carts of said another series of let-off carts.

Yet another object of this invention is to provide side wall and tread carriers which are disposed on the front side of the tire building machine for movement toward and away from the tire building drum, the carrier for the tread being designed to carry the elongated tread slab in looped configuration to conserve space since in a radial tire for example, the tread is applied on the carcass after expansion of the drum.

BRIEF DESCRIPTION OF THE DRAWING

FIG. 8 is an elevation view of the tread and side wall carriers, such view having been taken substantially along the line 8—8, FIG. 1B.

DETAILED DESCRIPTION OF A PREFERRED EMBODIMENT OF THE TIRE BUILDING MACHINE SERVICER

Tire building machine

The tire building machine TBM with which the present servicer is adapted to be used has a rotary drum D to which tire components are applied for building a tire carcass. For examples of tire building machines and components thereof reference may be had to the following patents:

Shook et al., 2,488,340
Mallory et al., 3,500,193
Mallory et al., 2,529,509
Mallory, 2,544,390
Jones, 2,555,343
Mallory, 3,031,353
Ewing et al., 3,051,220
Mallory et al., 3,125,481
Cantarutti, 3,438,832
Isaksson et al., 3,524,784
Cantarutti, 3,560,301
Gazuit, 3,647,598

In connection with the building of radial tires, reference may be had to the last two of the above-mentioned patents and to the following pending applications:

| Inventor | Ser. No. | Filed |
| --- | --- | --- |
| Gazuit | 887,399 | Nov. 17, 1969, now U.S. Pat. 3,674,751. |
| Gazuit | 877,400 | Nov. 17, 1969, now U.S. Pat. 3,674,604 |
| Gazuit | 28,281 | Apr. 22, 1970, Patent pending. |
| Cantarutti | 57,043 | July 22, 1970, now U.S. Pat. 3,692,605 |
| Cantarutti | 65,139 | Aug. 19, 1970, now U.S. Pat. 3,721,600 |
| George E. Enders | 93,103 | Nov. 27, 1970, now U.S. Pat. 3,728,194 |
| Jones et al | 143,846 | Dec. 17, 1971, now abandoned. |

General construction of servicer

The servicer 1 herein is shown by way of example only for supplying tire components to a radial tire building machine TBM and comprises three basic components viz. (1) a stock storing and conveying means 2 which extends rearwardly from the tire building drum D, stock being supplied thereto from a first series of interconnected stock let-off units or carts 3 which are indexed along rails 4 parallel to the axis of the drum D into successive register with the rear end of the storage and conveyor means 2; (2) a second series of stock let-off units or carts 5 also disposed to the rear of the drum D and under the storage and conveying means 2 for indexing movement along rails 6 parallel to the axis of the drum D, said units 5 having stock trays 7 from which the respective components are supplied to the tire carcass as it is being built when the respective trays 7 are in indexed registration with the drum D; and (3) tread and side wall carriers 8 and 9 disposed at the front of the drum D and adapted for movement toward and away from the drum D for application of the tread stock and side wall stock to the carcass being built on the drum D. In the ensuing description these three basic components of the servicer 1 will be described in detail.

Stock let-off units for stock storing and conveying means

Figure 1A:
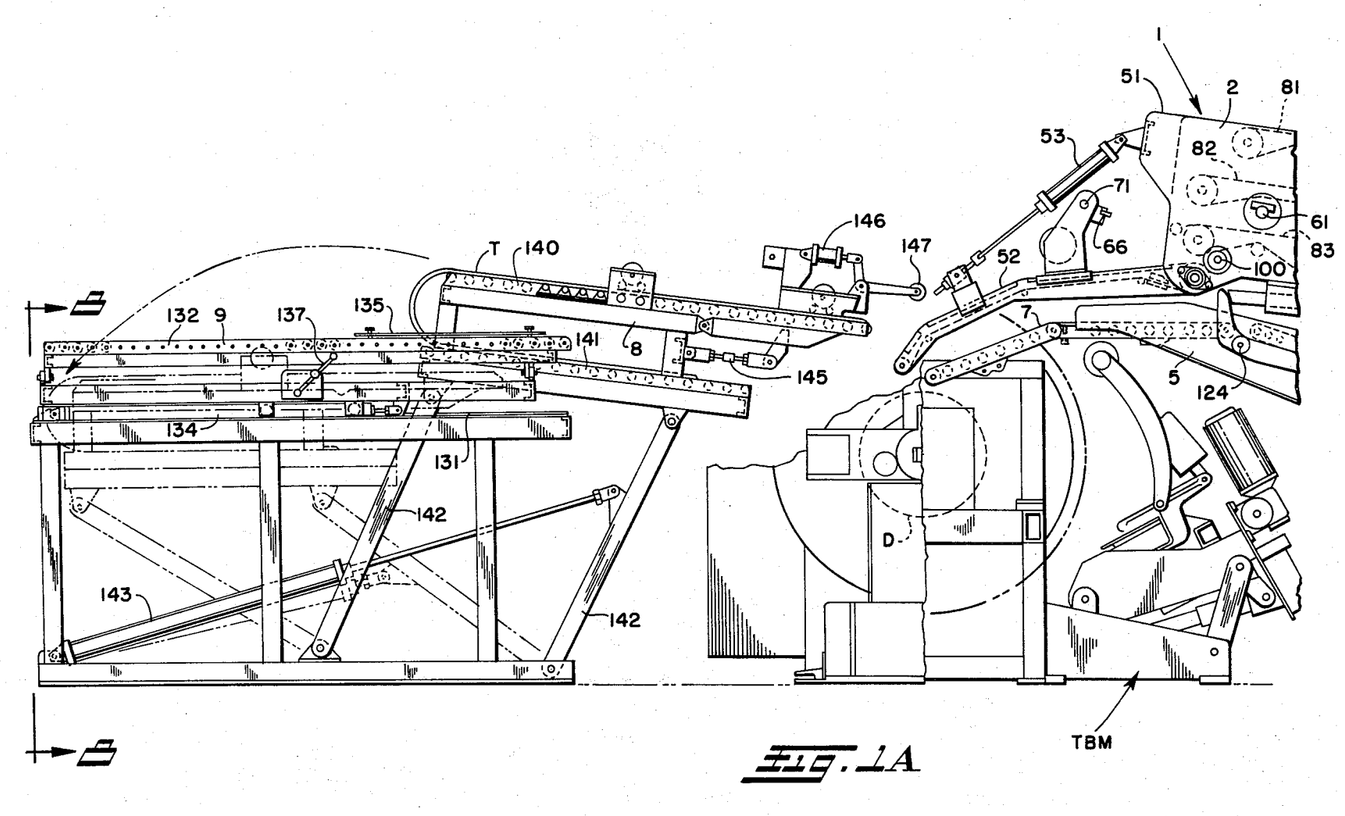
FIGS. 1A and 1B together constitute a side elevation view of a tire building machine and a servicer embodying the present invention.
Figure 1B:
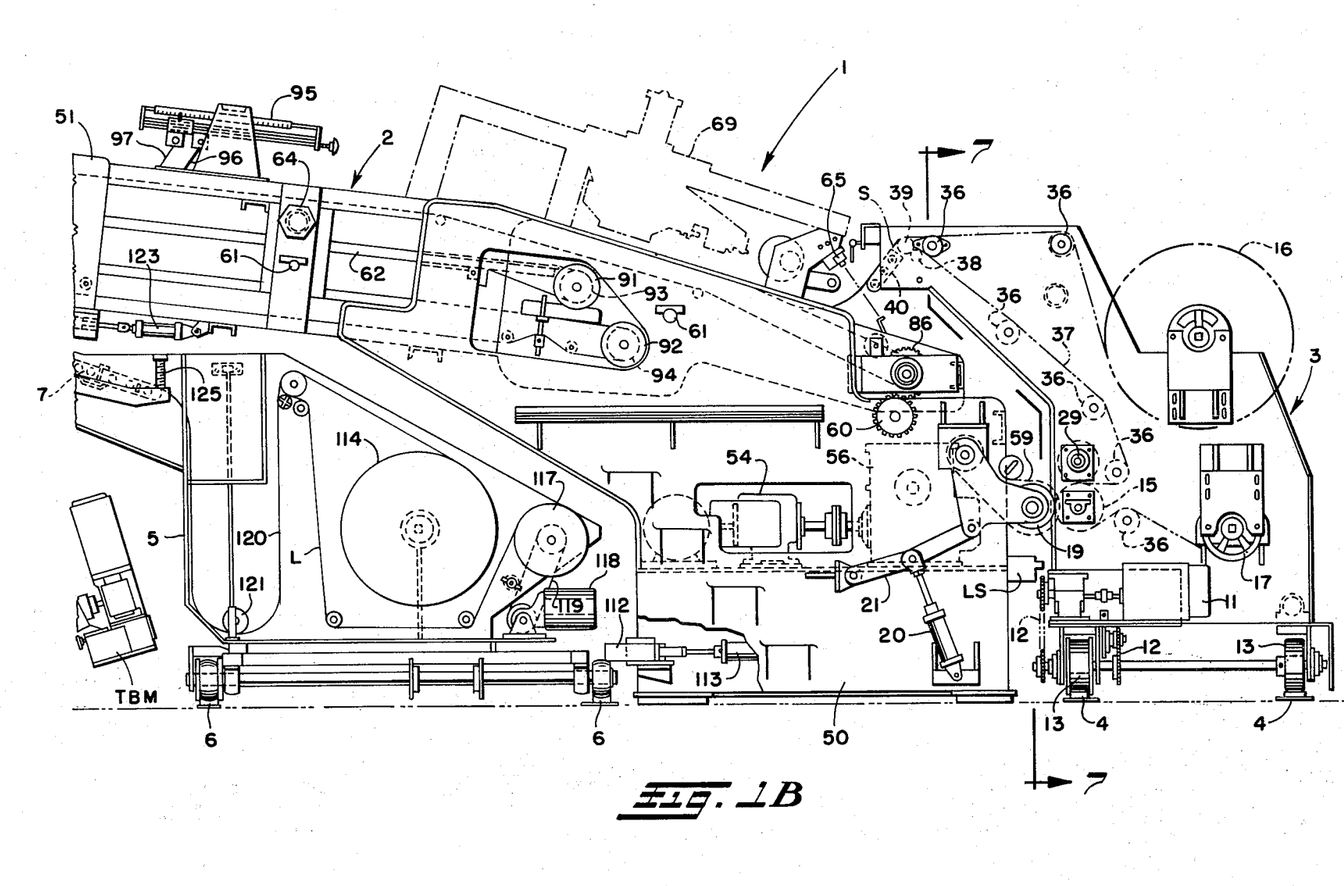
Figure 2:
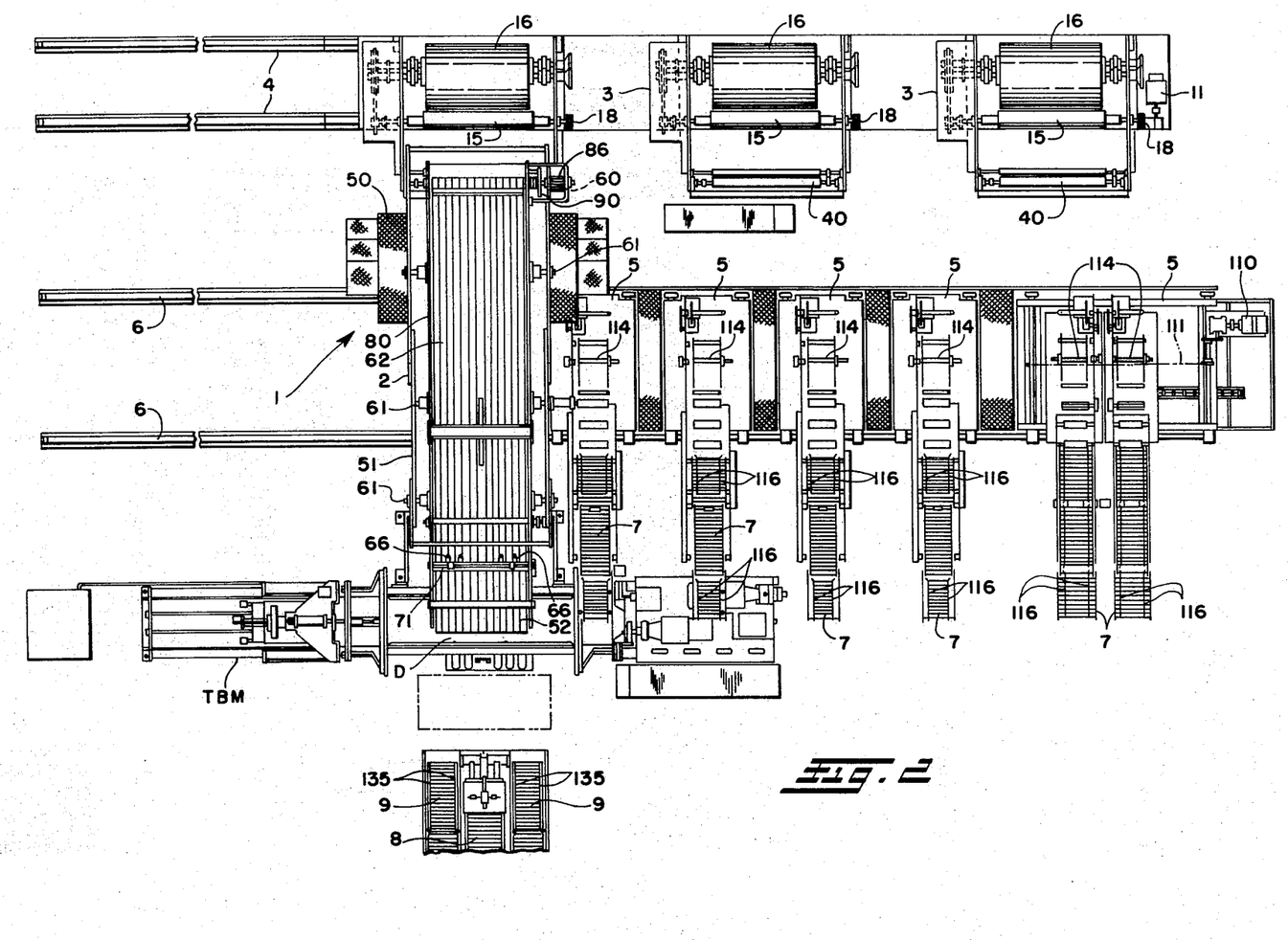
FIG. 2 is a top plan view of the servicer and tire building machine.
Figure 7:
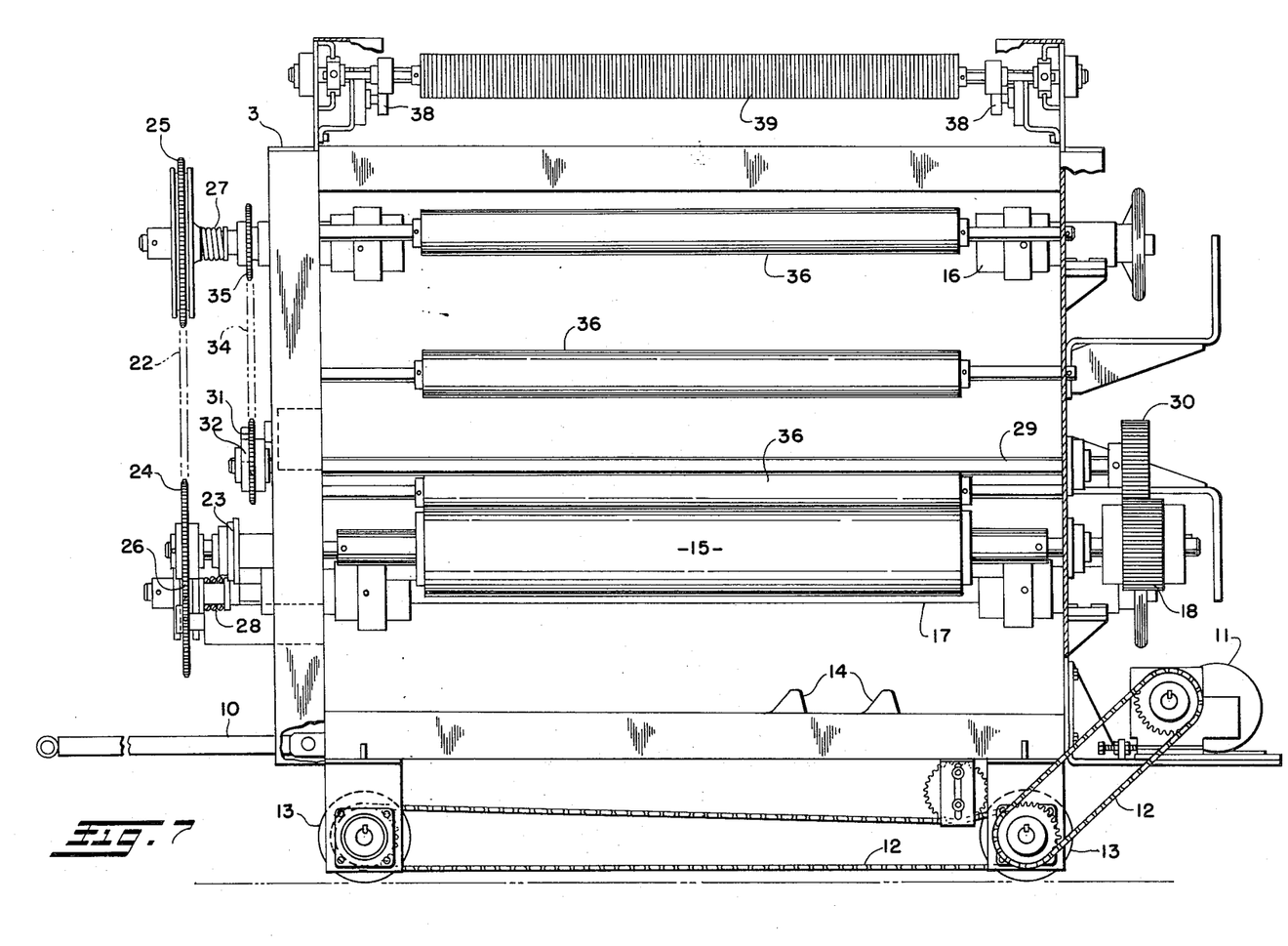
FIG. 7 is a front elevation view of one of the series of stock let-off carts as viewed along the line 7—7, FIG. 1B.
Figure 9:
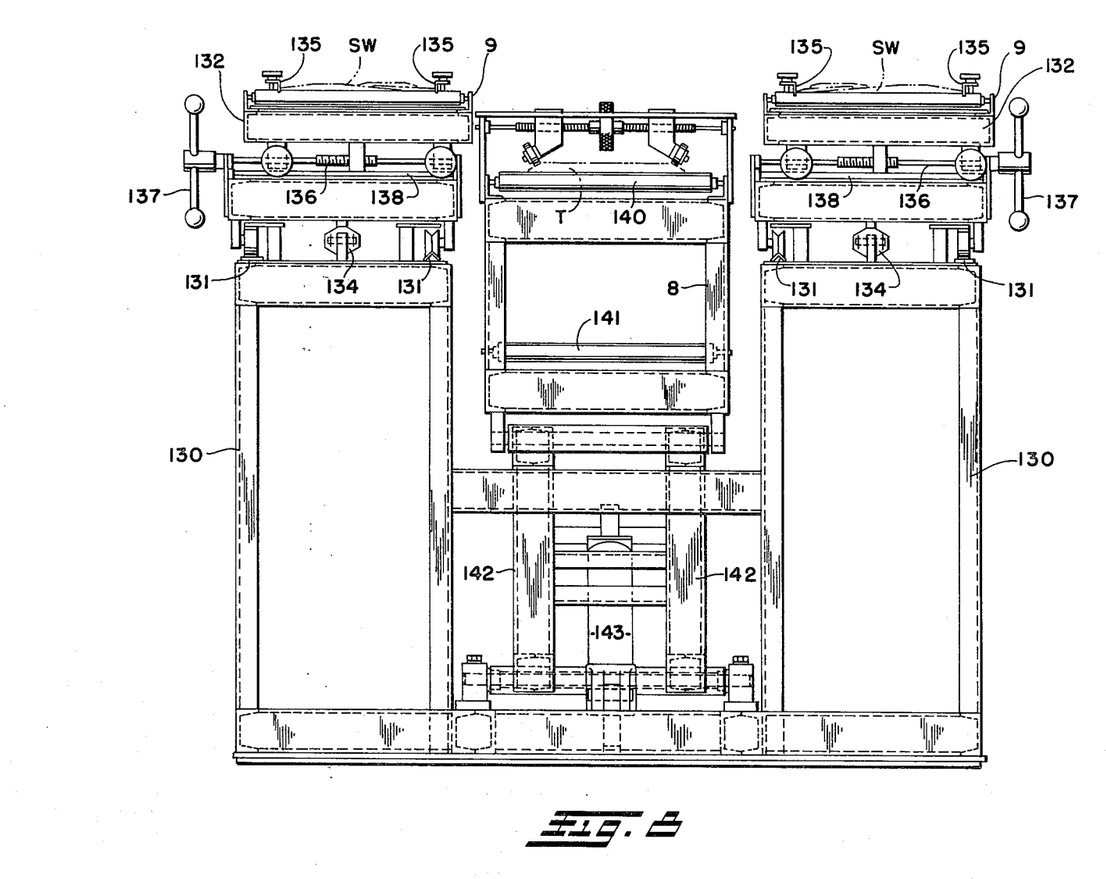

As shown in FIGS. 1B, 2 and 7 the stock let-off units 3 comprise a series of carts interconnected by draw-bars 10 and provided with wheels 13 running on rails 4 which are parallel to the axis of the drum D. The stock let-off carts 3 are driven along the rails 4 by a drive motor 11 on one cart 3 having a chain and sprocket drive 12 which drives the wheels 11 thereof. Each cart 3 has a pair of cams 14 thereon which cooperate with a switch LS adjacent the rear end of the stock storage and conveying means first to decrease the drive motor 11 speed when the first cam engages the switch LS and to de-energize the drive motor 11 when the second cam engages the switch LS thereby successively to position the carts 3 in register with the rear end of the stock storage and conveying means 2.

Each stock let-off cart 3 rotatably supports a drive roll 15, a stock roll 16, and a liner roll 17, the drive roll 15 having a gear 18 at one end thereof with which the drive gear 19 of the storage and conveying means 2 is adapted to be engaged when the cylinder 20 and linkage 21 is in the position shown in FIG. 1B and having a clutch 23 and sprocket wheel 24 at the other end thereof. The stock and liner rolls 16 and 17 have sprocket wheels 25 and 26 thereon driven by a chain 22 trained over said sprocket wheels 24, 25 and 26. The stock and liner rolls 16 and 17 have friction brakes 27 and 28 engaging the respective sprocket wheels 25 and 26. Each cart 3 has journalled therein a jack-shaft 29 having a gear 30 at one end thereof in mesh with the gear 18 on the drive roll 15 and having at its other end a drive sprocket 31 and clutch 32, said drive sprocket 31 having a chain 34 trained thereover and over another sprocket wheel 35 on the stock roll 16.

Each cart 3 also has rotatably supported parallel rolls 36 over which the liner 37 passes from the stock roll 16 to the liner roll 17 when it is desired to pay out stock S from the upper end of a cart 3 onto the rear end of the storage and conveying means 2. As well known in the art, the stock roll 16 will be composed of alternate convolutions of liner 37 and stock S.

When the liner 37 is disposed over the rollers 36, the drive roll 15, and the liner roll 17 as shown in FIG. 1B, driving of the drive roll 15 in a counterclockwise direction will, through the clutch 23 and friction brakes 27 and 28 tend to drive the stock roll 16 and liner roll 17 in a counterclockwise direction to cause take-up of the liner 37 around the liner roll 17 under tension thus to feed the stock S toward the left upper end of the cart 3. The rotation of the upper left roller 36 will through rubber rollers 38 rotate a brush 39 which causes the paid out stock S to pass over the brush 39 and move down along the inclined conveyor section 40 to the rear end of the storage and conveying means 2. When the drive roll 15 is thus driven in a counterclockwise direction, the jack-shaft 29 is turned in a clockwise direction but in this direction, the clutch 32 thereon slips.

When it is desired to reload an empty stock roll 16 the drive roll 15 is driven in a clockwise direction whereby the jack-shaft 29 is turned in a counterclockwise direction to drive the stock roll 16 in a counterclockwise direction through the clutch 32 and chain 34 and sprocket 31–35 drive. Such clockwise rotation of the drive roll 15 causes slippage of the clutch 23 whereby the liner roll 17 tends to be rotated in a counterclockwise direction through the friction brakes 27 and 28 thereby to maintain a tension on the liner 37 as it and the replenishing stock are being wound on to the stock roll 16. It is to be understood that the reloading operation may be performed while the carts 3 are disposed in an inoperative position to the left of the storage and conveying means 2 as viewed in FIG. 2. As will later be seen such reverse operation is also performed after the stock S has been severed on the storage and conveying means to retract the stock S onto the registering cart 3 for indexing movement to bring a succeeding cart 3 into register with the rear end of the storage and conveying means 2.

When the series of carts 3 are to the left of the storage and conveying means 2 as viewed in FIG. 2 as at the end of a working shift, they may be fully loaded for making tires during the next working shift. In the case of a radial truck tire, for example, the first two carts 3 may be loaded with cordless gum ply stock S and the third cart 3 may be loaded with cord ply stock S in which the parallel cords thereof extend perpendicularly across the width of the stock S (parallel to the drum D axis).

As will presently be described in detail the carts 3 will be indexed along the rails 4 to register with the rear end of the storage and conveying means 2 whereby lengths of stock S from the respective carts 3 will be let off onto the storage and conveying means 2 for cutting and storage during the time that other tire building operations are in progress.

Stock storage and conveying means

As shown in FIGS. 1A, 1B, 2, 3, 4, 5, and 6A and 6B, the stock storage and conveying means 2 comprises a base unit 50 having a forwardly and upwardly inclined portion 51 which terminates in a discharge conveyor section 52 actuated by the cylinder 53 between operating position and upwardly retracted position with respect to the tire building drum D. The base unit 50 carries a drive motor 54 and gear reducer 56, the output shaft 57 of the gear reducer being operative through chain drives 58 and 59 to drive the conveyor drive gear 60 and the let-off drive gear 19 which meshes with the gears 18 of the respective let-off units 3. As already mentioned, the let-off drive gear 19 is moved into and out of engagement with gears 18 by means of the cylinder 20 and linkage 21.

The forwardly and upwardly inclined portion 51 of the base unit 50 has parallel support shafts 61 thereacross on which a conveyor assembly 62 is mounted as by ball bearing slides 63 for transverse centering movement with respect to the stock S payed out from the respective let-off units 3 and with respect to the discharge conveyor section 52 which is centered with respect to the middle vertical plane of the tire building drum D. The conveyor assembly 62 is thus transversely adjusted by means of the power cylinder 64 which is controlled by guide sensing units 65 during the loading of the conveyor assembly 62 with stock S from the respective let-off units 3 and which is controlled by guide sensing elements 66 on the discharge conveyor section 52 for application onto the tire building stock S from the conveyor assembly 62 to the discharge conveyor section 52 for application onto the tire building drum D. There are also sensing units 67 and 68 between the sensing units 65 and 66 which detect the presence of stock S, the sensing units 67 also being used to determine the extent of rewind of the stock S after cutting by the severing device 69 on said conveyor assembly 62.

The sensing units 65-67 and 66-68 have threaded engagement with the respective left-hand, right-hand screw shafts 70 and 71 which are driven by electric motors 72 and 73 to adjust the spacing between the guide sensing units 65—65 and 66—66 to correspond to the widths of the stock S on the respective carts 3.

Figure 6A:
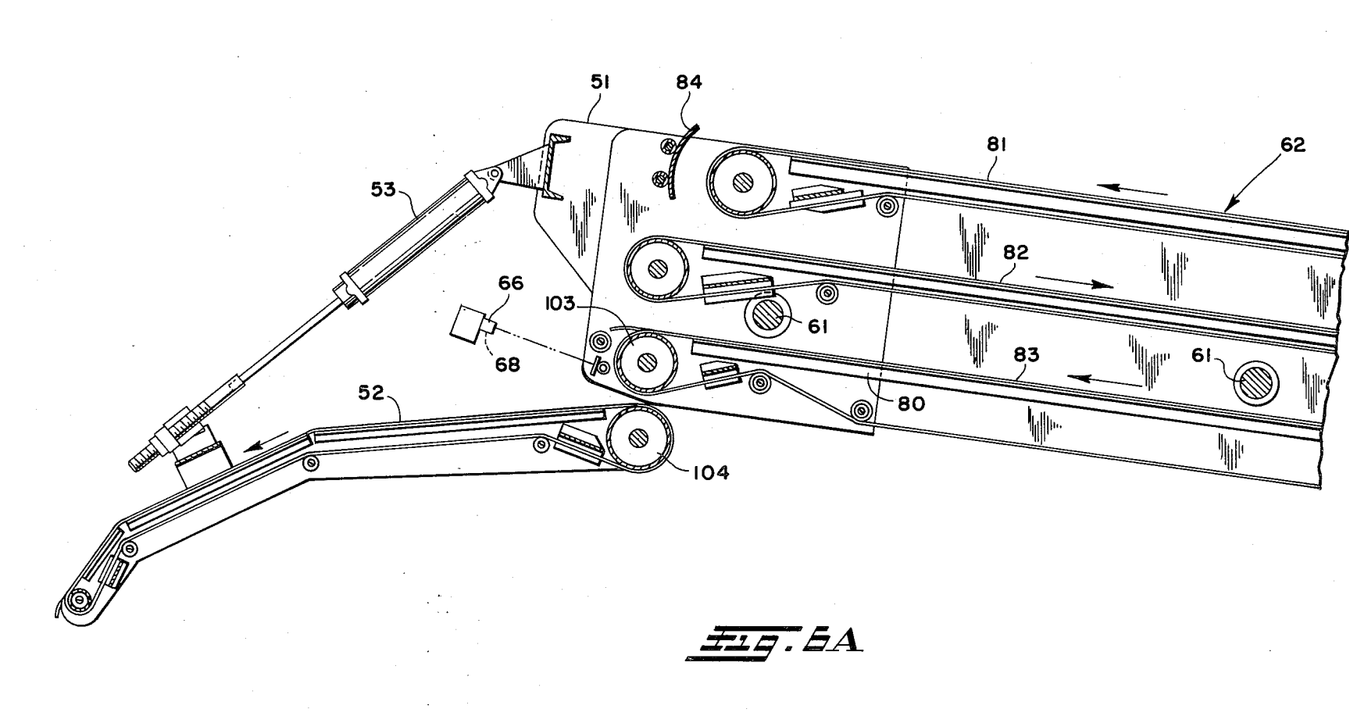
FIGS. 6A and 6B together constitute an enlarged longitudinal cross section view of the ply storage and conveyor means.
Figure 6B:
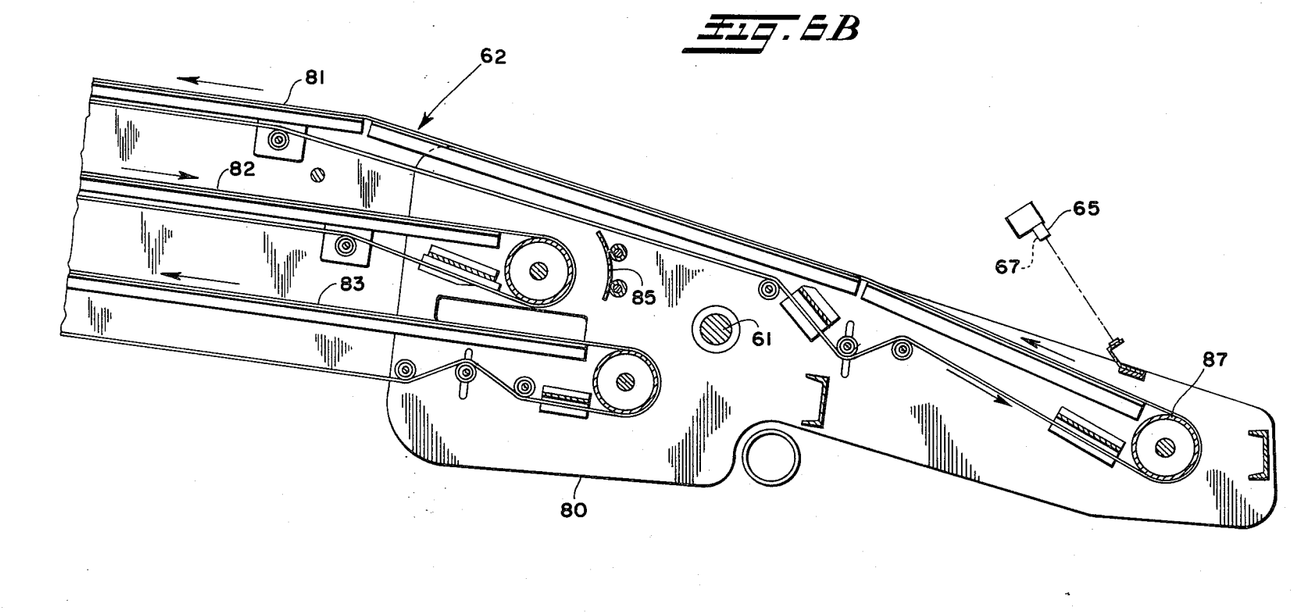

The conveyor assembly 62, as best shown in FIG. 6A and 6B comprises a frame 80 carrying three multiple belt conveyors 81, 82 and 83 onto the top conveyor 81 of which stock S is payed out from the respective let-off units 3 for travel toward the left and the stock 5, upon reaching the left hand end of the top conveyor 81 is turned by the concave plate 84 to be conveyed to the right by the middle conveyor 82 and, then, at the right hand end of the middle conveyor 82 and stock S is deflected by the concave plate 85 so as to be conveyed toward the left by the bottom conveyor 83 for discharge onto the discharge conveyor section 52 from which the successive pieces of stock S are conveyed for application to the tire building drum D.

The conveyors 81, 82 and 83 are driven by the conveyor drive gear 60 which meshes with the elongated face gear 86 of the transversely movable conveyor frame 80 which is coupled to the pulley 87 of the top conveyor 81 by clutch 89 and which is coupled by means of a chain drive 90 to the pulleys 91 and 92 of the respective middle and bottom conveyors 82 and 83, there being clutches 93 and 94 at said pulleys 91 and 92. The conveyors 81, 82 and 83 are driven through clutches 89, 93 and 94 in the directions indicated by the arrows in FIGS. 6A and 6B when stock S from the respective let-off carts 3 is being loaded onto the conveyor assembly 62 for cutting and storage. When the direction of the rotation of the conveyor drive gear 60 and let-off drive gear 19 is reversed to draw back the stock S onto the respective let-off carts 3 the clutches 89, 93 and 94 slip to prevent reversal of the conveyors 81, 82 and 83.

The frame 80 of the conveyor assembly 62 has thereon a stock severing device 69 and an adjustable measuring device 95 which may be constructed to operate in a manner similar to that disclosed in Cantarutti Pat. 3,429,490, for example, but preferably the severing device 69 is of the hot knife type as disclosed in the co-pending application of Enders et al. Ser. No. 298,021 filed Oct. 16, 1972, now U.S. Pat. 3,789,712, issued Feb. 5, 1974. When the three conveyors 81, 82 and 83 are driven in the directions indicated in FIGS. 6A and 6B, stock S coming off the let-off unit 3 then in register with the rear end of the storage and converging means 2 will engage the top conveyor 81 and be thereby conveyed toward the left until the sensing unit 96 of the measuring device 95 detects the leading end of the stock S whereupon the conveyors 81, 82 and 83 are decelerated and stopped when the leading end is detected by sensing unit 97. The severing device 69 is thereby actuated to cut the stock S to predetermined length. The let-off unit 3 is then operated in the opposite direction to draw the stock S until the sensing units 67 detect the end of the stock S, such reverse movement being permitted without corresponding reverse movement of the conveyors 81, 82 and 83 by reason of the clutches 89, 93 and 94 in the conveyor drive. When the stock S has been withdrawn as aforesaid, the series of let-off units 3 may be indexed to bring the next let-off unit 3 in register with the rear end of the storage and conveyor means 2 whereupon the drive gear 19 may be engaged with the drive roll gear 18 to pay out the next piece of stock onto the top conveyor 81. As successive pieces of stock S are loaded on the conveyor assembly 62 they are progressively advanced along the middle and bottom conveyors 82 and 83 for storage and then successive application onto the tire building drum D. As aforesaid, the present servicer 1 has been illustrated in connection with the building of a radial truck tire and hence the cords of the cord ply stock will extend perpendicular to the sides of the stock and the severing device 69 will be adjusted to sever the cord ply stock by movement between adjacent cords.

The three conveyors 81, 82 and 83 will accommodate several lengths of stock S sufficient to build a single tire and such loading operation may be performed while other tire building operations are being performed as hereinafter to be described.

The front end of the conveyor assembly 62 has thereon an elongated gear 100 which meshes with gears 101 and 102 on the pulleys 103 and 104 of the bottom conveyor 83 and discharge conveyor 52 respectively, the latter being secured to the tip of the portion 51 of the base unit 50 for upward and downward pivotal movement about the axis of the pulley 104 by means of cylinder 53.

With the conveyor asesembly 62 loaded with the desired number and lengths of stock S the conveyor assembly 62 is actuated to cause the successive pieces of stock S to be conveyed for application to the surface of the drum D and upon each other from the tip of the discharge conveyor 52 to build up the body of the tire carcass comprising a plurality of plies which ordinarily will overhang the ends of the drum D. After application of the plies from the conveyor assembly various other operations may be performed such as turning down the plies over the shoulders of the drum D, placing the tire beads on the turned down portions, turning up of overhanging ends of the plies around the beads and stitching the same to the outer ply.

After the successive pieces of ply stock S have been applied on the drum D, the cylinder 53 may be retracted to pull up the discharge conveyor 52 to an inoperative position, and at that time, the conveyor assembly 62 may be reloaded from the let-off units 3 with a new set of pieces of stock S for the next tire carcass.

Finishing strip, belt cushion, and belt let-off units

As best shown in FIGS. 1A, 1B and 2 the stock let-off units 5 comprise a series of let-off carts which are interconnected together and which are indexed along the set of rails 6 disposed between the let-off rails 4 and the tire building machine (TBM), said let-off carts 5 being driven as by an electric motor 110 and sprocket and chain drive 111 on one of them. Successive indexing of the series of let-off carts 5 is accomplished as by means of the stop pin 112 on the base unit 50 actuated by the cylinder 113 into and out of the path of the successive carts 5 (see FIGS. 1B and 3). Preferably the drive motor 110 remains energized for a few seconds after each cart 5 engages the stop pin 112.

The let-off carts 5 are preferably of substantially identical construction except that the first one carries two stock rolls 114 (finishing strips) and has two let-off trays 115 while the remaining carts have single let-off trays 7, each tray 7 being provided with adjustable guides 116 to properly guide the movement of the stock from the stock rolls 114 for application to the tire building drum D.

In the building of a radial tire, the tire building drum D will generally be expanded in the middle to form the crown portion of the carcass with the sides diverging radially inwardly and terminating at the tire beads. When the first let-off cart 5 is in indexed position the let-off trays 7 thereof are properly positioned so that the finishing strips or the like may be applied around turn up bladders or the like adjacent the tire beads thus to apply, upon expansion of the turn up bladder, the finishing strips to the sides of the expanded carcass.

Figure 3:
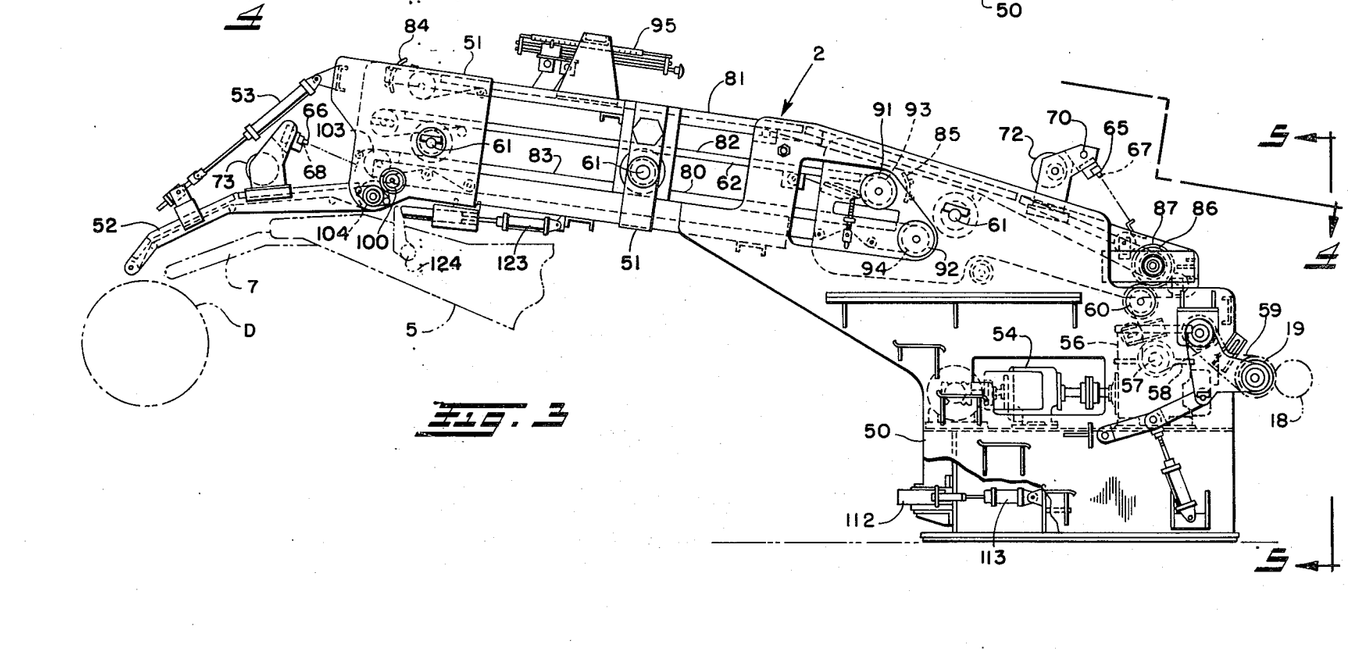
FIG. 3 is a side elevation view of the ply storage and conveyor means.
Figure 4:
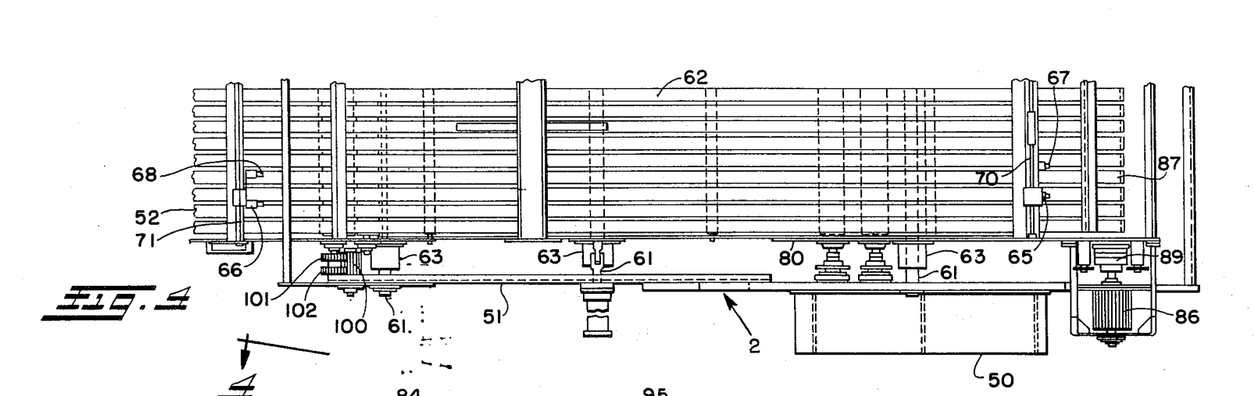
FIGS. 4 and 5 are respectively top plan and rear end elevation views of the ply storage and conveyor means taken substantially along the lines 4—4 and 5—5, FIG. 3.
Figure 5:
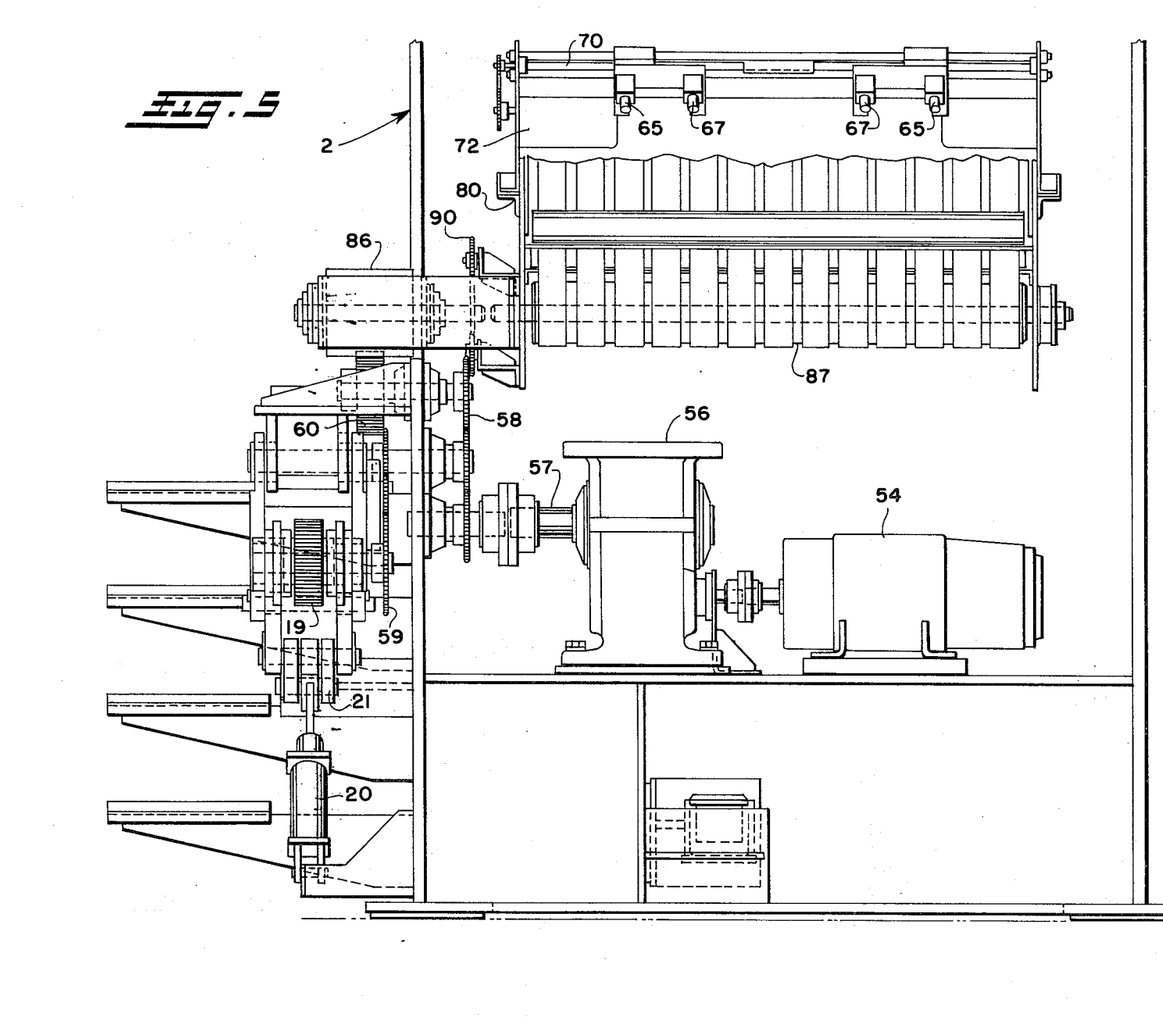

When the remaining carts 5 are successively indexed to register with the crown portion of the carcass, the belt cushion and belts may be successively applied around said crown portion. Each let-off cart 5 has a support for the stock roll 114 including an intervening liner L which is wound up on a liner roll 117 by means of the drive motor 118 and sprocket and chain drive 119 as shown in FIG. 1B to feed the stock to the respective let-off tray 7 with a loop of the stock in the form of a festoon 120. The motor 118 is controlled by an appropriate dancer roll 121 to maintain a loop 120 of predetermined minimum and maximum length. When it is desired to apply stock from a particular let-off tray 7 onto the drum D, the cylinder 123 on the portion 51 of the base unit 50 is actuated as shown in FIGS. 1A, 1B and 3 to move the tray 7 downwardly about pivot 124 and against the tray return spring 125 so that the leading end of the stock may be applied by the operator onto the drum D or onto the crown portion of the carcass. Rotation of the drum D will then wrap the stock around the drum D or onto the crown portion of the carcass. After the application of the last belt from the last of the series of let-off carts 5, the tire carcass is now ready for application of the side wall stock and tread stock disposed on the carriers 9 and 8 which are located on the front side of the tire building drum D.

Side wall and tread carriers

The two side wall carriers 9 each comprises, as shown in FIGS. 1A, 2 and 8 a stand 130 provided with rails 131 perpendicular to the axis of the drum D along which a side wall support conveyor 132 is moved from a retracted position as shown in FIG. 1A to an operating position with the end of each conveyor 132 adjacent the drum D as by means of fluid operated cylinder 134. Each side wall strip SW is guided between the adjustable guides 135, and lateral adjustment of each conveyor 132 is effected as by a suitable screw mechanism 136 operated by the hand wheel 137, the conveyor 132 being supported by rails 138 for such adjustment parallel to the axis of the drum D. Generally, the side wall strips SW on the carriers 9 will be applied on turn up bladders adjacent the beads of the expanded carcass and upon actuation of the turn up bladders and strips SW will be applied on the opposite sides of the expanded carcass.

The tread carrier 8 comprises two conveyor sections 140 and 141 disposed one above the other and carried thereby in a looped configuration as shown in FIG. 1A is a thread stock strip T which necessarily is of greater length than the side wall strips SW since the thread stock T is applied on the crown portion of the expanded carcass. The conveyor sections 140 and 141 are supported by links 142 which are actuated by means of the cylinder 143 to actuate the conveyors 140 and 141 from the retracted dot-dash position of FIG. 1A to operating position whereat the free end of the upper conveyor section 140 is substantially tangent to the crown portion of the tire carcass, the tip of the upper conveyor section 140 being adjustable up and down and as by means of the turnbuckle 145 and when the treatd stock T is to be applied, the leading end is applied onto the expanded tire carcass, and the cylinder 146 is actuated to cause the stitching roll 147 to firmly press the tread stock T against the carcass to stitch it to be the crown portion of the tire carcass. Thereafter, the tread carrier 8 may be returned to the retracted position ready for reloading with another strip of tread stock T in looped configuration as shown.

Likewise, after the application of the side wall strips SW, the carriers 9 therefor may be moved to a retracted position as shown in FIG. 1A ready for reloading with strips SW for building the next tire carcass.

SUMMARY

As can be seen from the preceding description, the present invention contemplates a servicer 1 for a tire building machine TBM to enable rapid and precise building of tire carcasses and as evident the two series of let-off units 3 and 5 can have sufficient stock thereon to build all the tires that can be built during a single work shift, and therefore, it is only necessary to replenish the stock rolls thereof at the end of each work shift. Although not shown herein, suitable means will be provided for supplying tread stock T and side wall stock SW to the carriers 8 and 9 during the time that other tire building operations are being performed.

It is to be understood that suitable electronic control equipment will be provided to control the operation of the tire building machine (TBM) and to correlate the operation of the series of let-off units 3 and 5 carriers 8 and 9 with the operation of the tire building machine (TBM), the provision of such control equipment being within the realm of skill of a person versed in the art.

As heretofore mentioned, the building of a radial ply truck tire is to be considered as exemplary only and its is to be understood that the servicer may readily be modified to build tires in which the plies have cords extending at bias angles and in that case the severing device 69 will be adjusted to make severing stroke between the successive biased cords. Tires having biased cords may be constructed in generally cylindrical form on the tire building drum D followed by shaping and curing in a tire curing press. In the case of radial tires, the drum D may be expanded to expand the carcass to approximately final tire shape whereby the tire curing press effects final shaping and curing.

We therefore, particularly point out and distinctly claim as our invention:

1. A servicer for supplying tire building stock to a tire building drum comprising a series of stock let-off units disposed to one side of the drum and mounted for indexing movement parallel to the drum axis; each said unit carrying a stock roll from which tire building stock is unwound for feeding toward the drum; and a storage and conveyor device between the drum and said series of units adapted to receive and store stock from the stock rolls of said units when they are in their respective indexed positions registering with said device, and to convey the stored stock for successive application around the drum.

2. The servicer of claim 1 wherein a trackway supports said series of units for such indexing movement; and wherein one of said units has drive means for indexing all of said units.

3. The servicer of claim 1 wherein said device has drive means operative to engage the respective units to drive the stock rolls thereof and to drive said device to convey the stock received from said units for storage in said device, said drive means further being operative to drive said device to convey the stored stock for successive application around the drum.

4. The servicer of claim 1 wherein said device comprises a plurality of superimposed conveyor sections which are arranged initially to convey stock received from the respective units generally toward the drum, then away from the drum, and finally toward the drum whereby stock from the respective units may be stored on said device while minimizing the distance between the drum and said series of units.

5. The servicer of claim 1 wherein said device comprises a base having a discharge conveyor section adjacent the drum and a receiving and storage conveyor section transversely movable on said base and disposed between said discharge conveyor section and said series of units; means for transversely moving said receiving and storage conveyor section, and sensing units on said conveyor sections to actuate said means respectively to center said receiving and storage conveyor section with respect to the stock received from the respective units and to center the stock stored on said receiving and storage conveyor section with respect to said discharge conveyor section as the stored stock is conveyed by said conveyor sections for application around the drum.

6. The servicer of claim 5 wherein said discharge conveyor section is pivotally mounted on said base about an axis parallel to the drum axis; and wherein means connected between said base and said discharge conveyor section is operative to swing the latter downwardly for application of stock therefrom around the drum and upwardly to an inoperative position.

7. The servicer of claim 6 wherein said base has an upper portion extending toward the drum and thereabove to which said discharge conveyor section is thus pivotally mounted; wherein said receiving and storage conveyor section is disposed in said upper portion of said base; and wherein another series of stock let-off units is disposed beneath said upper portion of said base and mounted for indexing movement parallel to the drum axis, each said unit of said another series of units carrying a stock roll from which tire building stock is unwound for feeding toward the drum, each said unit of said other series of units having a stock supporting guide tray along which the stock is guided when applied around the drum.

8. A servicer for supplying tire building stock to a tire building drum comprising a first series of stock let-off units disposed to one side of the drum and mounted for indexing movement parallel to the drum axis; a second series of stock let-off units disposed between the drum and said first series of stock let-off units and also mounted for indexing movement parallel to the drum axis; each of said units of said first and second series of units carrying a stock roll from which tire building stock is unwound for feeding toward the drum; a storage and conveyor device disposed above said second series of units and extending between the drum and said first series of units, said storage and conveyor device being adapted to receive and store stock from the stock rolls of the units of said first series of units when they are in respective indexed positions registering with said device, and to convey the stored stock for successive application around the drum; and means for indexing said second series of units for application of the stock therefrom around the drum during the time that said device is receiving and storing stock from said first series of units.

9. The servicer of claim 8 wherein one unit of each series of units has drive means for effecting indexing movement of the respective series of units.

10. The servicer of claim 8 wherein each unit of said second series of units has drive means to drive the stock roll thereof to unwind stock therefrom and to store it in the form of a festoon of stock which has its leading end disposed on a tray which is disposed generally tangent to the drum when said unit is in indexed position registering with the drum; said drive means being under the control of said festoon of stock to render said unit ready for application of stock from said tray to the drum the next time that said unit is brought into indexed position in registry with the drum.

11. The servicer of claim 8 wherein a carrier for stock of precut length is disposed on the other side of the drum; and wherein drive means operatively engaged with said carrier moves the latter toward the drum for application of the stock thereon to the drum and away from the drum to a retracted position for reloading with stock and for providing a space on said other side of the drum for application of stock from said second series of units.

12. The servicer of claim 11 wherein said carrier is arranged to support lengths of side wall stock in parallel spaced apart relation.

13. The servicer of claim 11 wherein said carrier is arranged to support a length of tread stock in a looped configuration thus to shorten the length of said carrier.

14. The servicer of claim 11 wherein said carrier comprises three side-by-side parallel sections, the middle section of which is arranged to support a length of tread stock thereon and the other two sections of which are arranged to support lengths of side wall stock thereon; said drive means being selectively operative to move said sections in predetermined sequence toward and away from the drum.

15. The servicer of claim 14 wherein said middle section is arranged to suport the tread stock thereon in looped configuration to shorten the length of said middle section.

16. A servicer for supplying tire building stock to a tire building drum comprising a first series of stock let-off units disposed to one side of the drum and mounted on a first trackway for indexing movement parallel to the drum axis; a second series of stock let-off units disposed between the drum and said first series of stock let-off units and mounted on a second trackway for indexing movement parallel to the drum axis; each of said units of said first and second series of units carrying a stock roll from which tire building stock is unwound for feeding toward the drum; a base between said first and second trackways having an upper portion extending toward the drum above said second series of units; a storage and conveyor device disposed on said base and upper portion thereof to extend between the drum and said first series of units; the device comprising a discharge conveyor section having its rear end connected to said upper portion for movement of its front end downwardly toward the drum and upwardly away from the drum, and a receiving and storage conveyor section adapted to receive and store stock from the stock rolls of the units of said first series of units when they are in respective index positions registering with said receiving and storage conveyor section and to convey the stored stock to said discharge conveyor section for successive application around the drum when said discharge conveyor section has its front end moved downwardly toward the drum; said units of said second series of units having trays extending toward the drum and beneath said discharge conveyor section in the respective index positions of said second series of units from along which trays the stock is guided for application to the drum.

17. The servicer of claim 16 wherein said trays have their rear ends connected to the respective units of said second series of units for movement of the front ends thereof downwardly toward the drum and upwardly away from the drum when in indexed positions registering with the drum.

18. The servicer of claim 16 wherein said receiving and storage conveyor section is transversely movably supported on said base and upper portion thereof; means on said base for transversely moving said receiving and storage conveyor section; and sensing units on said conveyor sections to actuate said means respectively to center said receiving and storage conveyor section with respect to the stock received from the respective units of said first series of units and to center the stock stored on said receiving and storage conveyor section with respect to said discharge conveyor section as the stored stock is conveyed by said conveyor sections for application around the drum.

19. The servicer of claim 17 wherein said upper portion of said base has means operatively connected to said trays to move them downwardly toward the drum when the respective units of said second series of units are in indexed positions registering with the drum.

20. The servicer of claim 16 wherein severing means on said receiving and storage conveyor section is operative to sever the stock received from the respective units of said first series of units to predetermined lengths; and wherein said device has drive means operative to engage the respective units of said first series of units to drive the stock rolls thereof and to drive said device to convey the stock received from said units for storage on said receiving and storage conveyor section, said drive means further being operative to drive the respective stock rolls to draw back the severed stock from said receiving and storage conveyor section preparatory to indexing of the next unit of said first series of units into register with said receiving and storage conveyor section.

References Cited
UNITED STATES PATENTS

| | | | |
|---|---|---|---|
| 1,961,725 | 6/1934 | Abbott, Jr. | 156—398 |
| 1,964,363 | 6/1934 | Ostling et al. | 156—111 |
| 2,253,477 | 8/1941 | Brown | 156—406 X |
| 2,253,781 | 8/1941 | Haase et al. | 156—111 |
| 2,665,757 | 1/1954 | Stevens et al. | 156—405 X |
| 2,918,105 | 12/1959 | Harris | 156—406 X |
| 3,162,562 | 12/1964 | Wenger et al. | 156—406 |
| 3,216,879 | 11/1965 | Mallory et al. | 156—406 |
| 2,832,396 | 4/1958 | Harris | 156—406 X |
| 3,551,252 | 12/1970 | Bishop et al. | 156—406 |
| 3,556,901 | 1/1971 | Tearne | 156—406 |

CLIFTON B. COSBY, Primary Examiner

U.S. Cl. X.R.

156—111, 396